United States Patent

Ichikawa et al.

[11] 4,026,103
[45] May 31, 1977

[54] ELECTRONIC TIMEPIECE WITH DIGITAL DISPLAY MEANS

[75] Inventors: Shingo Ichikawa, Sayama; Yoshinobu Kashima, Tanashi; Hirotoki Takamune, Tokorozawa, all of Japan

[73] Assignee: Citizen Watch Co., Ltd., Tokyo, Japan

[22] Filed: Dec. 1, 1975

[21] Appl. No.: 636,606

[30] Foreign Application Priority Data

Dec. 2, 1974 Japan .......................... 49-139280
Dec. 17, 1974 Japan .......................... 49-144677
Oct. 16, 1975 Japan .......................... 50-124706
Oct. 21, 1975 Japan .......................... 50-125972
Oct. 22, 1975 Japan .......................... 50-127142

[52] U.S. Cl. .................. 58/50 R; 58/127 R; 340/324 R; 350/160 LC
[51] Int. Cl.² ................ G04B 19/30; G04B 19/06; G08B 23/00; G02F 1/13
[58] Field of Search ............ 58/23 R, 50 R, 127 R; 340/324, 336; 350/160 LC, 161

[56] References Cited

UNITED STATES PATENTS

| 3,540,209 | 11/1970 | Zatsky et al. | 58/50 R |
| 3,715,881 | 2/1973 | Girard | 58/50 R |
| 3,757,511 | 9/1973 | Burgess et al. | 58/50 R |
| 3,912,370 | 10/1975 | Roach | 350/161 S |
| 3,914,932 | 10/1975 | Teraishi et al. | 58/50 R |

*Primary Examiner*— E. S. Jackmon

[57] ABSTRACT

The invention concerns with an electronic timepiece provided with digital display means including an elastomeric display element. This element has an uppermost transparent and solid plate which is made of glass or plastic resin material, serving as a solid base member of the element durable to outside mechanical stresses and shocks. The thickness may amount to about 0.2–2 mm, or so. Transparent upper electrodes are provided at the lower surface of the glass or plastic resin plate, these electrodes being shaped and arranged in registration with the display segments of a scheduled display pattern. The thickness may be in the order of 500–2,000 Å.

12 Claims, 18 Drawing Figures

ELECTRONIC TIMEPIECE WITH DIGITAL DISPLAY MEANS

BACKGROUND OF THE INVENTION

This invention relates to novel electronic timepieces with solid state illumination digital display means. As the conventional electroluminescent digital display means of low power consumption, liquid crystal displays have been representatively and perhaps most broadly used.

When taking, as a most commonly known representative of field effect liquid crystal display structure broadly used nowadays in the field of electronic digital display timepieces, it comprises a mass of liquid crystal material which is sealed-in between an upper and a lower glass plate member through spacer means defining the peripheral mergin of the liquid crystal mass. This liquid crystal display cell further comprises upper and lower polarizer plates attached to respective glass plate members carrying thereon a respective pattern of transparent electrodes arranged to generate the field effect for the digital displaying service. The lower glass plate member is attached at the lower polarizer side with a reflecting layer or plate through a spacer.

The cell is mounted on an IC-block-carrying base board in proper registration with an electrodes pattern formed on the board and electrically connected with the pattern and mechanically fixed to the board by means of connectors, preferably in the form of conductive rubber laminated strips, for illuminating visible display of electrical informations coming from the integrated circuit.

According to practical experience in the use of liquid crystal digital display cells, the following various drawbacks have been encountered.

The interelectrode gap in the cell which is fitted in the electronic watch or the like should be maintained at a very fine and small distance such as less than 20 microns or so on account of highly crowded spacial requirements of the watch and of such limitation imposed by the working voltage value. Much labor and cost must be consumed therefore for sealed charge of liquid crystal mass in position, thereby a mass production of these cells being substantially disturbed.

As a second drawback, although the charging quantity of the liquid crystal material is very small for each display cell, severe and precise caution must be paid for control of its aqueous and the like foreign matter content during preservation for the positive and advance prevention of otherwise invited later deterioration of the liquid crystal characteristics.

It has been further experienced during an elongated use of the liquid crystal cell that the electrolytic reaction is caused to take place within the liquid crystal material by application of voltage between the display electrodes which accelerates the deterioration of the material and substantially inhibits the rather preferable d.c. voltage application.

The aforementioned specific seal-in structure of the liquid crystal cell, the finished shape of the latter is substantially limited to square, rectangular or circular one.

A main object of the present invention is to provide an electronic digital display timepiece having improved digital display means more reliable in its operation for an extended time period and rather easy in assembly to the timepiece proper.

It is a further object of the invention to provide an electronic digital display timepiece having improved digital display means of a satisfactory illuminating performance with simpler structure.

It is a still further object of the invention to provide an electronic digital display timepiece having an irregular shaped display surface area.

A still another object of the invention is to provide an electronic timepiece of the above kind, having a number of display elements which can be driven with d.c. or a.c. low voltage signals.

SUMMARY

For attaining the aforementioned objects, a main feature of the present invention resides in the provision of an elastomeric display unit in place of the conventional liquid crystal display.

The elastomer display unit may be preferably covered by an optical filter for the prevention of detrimental light rays from invading into the interior of the unit.

The elastomeric display unit may preferably be so constructed that an elongated pattern may be formed on a base board and constitute part of said unit.

The elastomeric display element may constitute a laminated structure, a part of the laminate layers may be so cut off to provide a light pass window and a light source may be provided so as to cooperate the said window. If necessary, the window may be a perforation.

The elastomeric display element may be provided with a reflecting layer, as in the similar way to the conventional liquid crystal display element. The reflecting layer may be formed with a light pass window for the similar purpose as above.

The elastomeric display element may be impressed with a d.c. bias voltage and signal voltage may be impressed thereon in an overlapped way.

The elastomeric display element or structure comprises an uppermost transparent and solid layer or plate which is made preferably of glass or plastic resin material, such as preferably acrylic, polycarbonate, styrol, or transparent polyvinyl chloride resin. This serves as a solid base member of the structure durable to outside mechanical stresses and shocks. This member allows passage of outside light beams on the one hand, and protects inner constituents from outer mechanical shocks. The thickness may amount preferably to about 0.2–2 mm, or so.

Transparent upper electrodes are provided at the lower surface of the said glass or plastic resin plate, said electrodes being shaped and arranged in registration with the display segments of a scheduled display pattern. The thickness may preferably be in the order of 500–2,000 A in no limiting sense. The material of these upper electrodes may preferably be $In_2O_3$; $SnO_2$; CdO; Au; Pt or any combination of these. The deposition may be relied upon evaporative deposition cathodic sputtering or ionic plating, or briefly the physical vapor deposition technique.

Under the lower surface of the glass or plastic resin plate, there is provided an insulating and transparent elastomeric layer which embeds therein the above mentioned upper electrodes. The material thereof may preferably be any one of or any combination of silicon resin, silicon rubber, neoprene rubber, butadiene rubber, butadiene nitrile rubber, choloroprene rubber, isoprene and natural rubber. The necessary properties owned by these elastomeric materials are softness, light pass ability and high dielectric strength, the latter being preferably 5–30 kV/mm. This material is applied at first in its liquid state and then solidified. It may contain a small quantity of conventional catalyser for accelerating the solidification. However, silicon rubber and the like rubber material may solidify by absorbing aqueous humidity contained in the atmospheric air without addition of solidification accelerator. The application of liquefied elastomer may be performed by means of a conventional spinner, spray gun or the like instrument.

At the bottom surface of the above transparent and insulating elastomeric layer, a reflecting layer is provided in the form of a thin film-like layer of In, Au, Ag, Al or Pt, or a combination thereof. The thickness of this reflecting layer may be in the order of 500–1,000 A.

A non-transparent and conductive elastomeric layer is provided directly below the reflecting layer which may comprises a mixture of any one or more of said elastomeric materials compounded with a conducting amount of carbon, gold, silver, aluminium or the like fine metal powder, the admixture being carried away in the similar way to the commonly known manufacture of conductive resins. Finely divided conductive material of carbon and/or metal may be in the similar state to the pigment for coloring any resin material by compounding. This layer, when voltage charged, will act as a common and lower electrode cooperable with the upper electrodes.

As a result of the field effect invited by the voltage application, fine carbon or metal particles contained in the uppermost superficial zone, the thickness being in the order of 2 microns or so, are electrostatically attracted or repulsed towards or from the charged upper electrodes and the areas geometrically projected from the charged upper electrodes at the upper surface of the lower elastomeric layer will become uneven to represent corresponding "frosted" zones which represent sharp contrast in comparison with the neighboring plain and unfrosted zone, which are visible from upper to human eyes, if light is projected from upper into inside of the elastomeric display structure. For this purpose, the upper and lower electrodes are electrically connected to a voltage source, say of 30 volts, at the opposite poles thereof through corresponding leads and switching means, for selective digital display. Naturally, the upper electrodes are arranged in registration with a display pattern. The frosted area performs a kind of irregular reflection.

These and further objects, features and advantages of the invention will become more apparent when read the following detailed description of the invention with reference to the accompanying drawings.

DETAILED DESCRIPTION OF THE INVENTION

In the following, several preferred embodiments of the invention will be illustrated with reference to the accompanying drawings.

Figure 1:
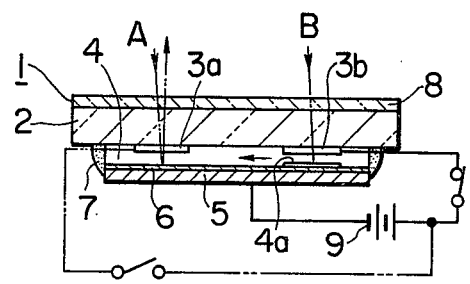
FIG. 1 is a schematic vertical section of a elastomeric display structure shown in a highly simplified form.

At first, referring to FIG. 1, an embodiment of an elastomeric display structure which constitutes an important constituent of the electronic timepiece will be set forth in detail.

In FIG. 1, numeral 1 represents in general of the elastomeric display structure; 2 a transparent base board, preferably made of glass or solid plastic resin material having naturally an electrical insulating performance.

Transparent electrodes 3a and 3b are formed firmly on the lower surface of the board 2 by the conventional technique, such as, preferably by evaporative depositing technique. The number of these electrodes is shown only by way of a simplified example.

Numeral 4 represents an elastomeric display element made preferably of silicon rubber which is transparent and elastic and made into thin film, the thickness thereof being 6 microns or so.

Numberal 5 represents a lower electrode made preferably of conductive rubber material consisting of a mixture of natural or synthetic rubber with finely divided carbon and silver, as an example, said elastomeric display element 4 being sandwiched between said lower electrode 5 and transparent base board 2 through a reflecting layer 6 made of indium oxide or the like precious metal oxide. As shown only partially, the periphery of the element 4 is sealed off and firmly attached to neighboring elements by means of conventional adhesive material 7, preferably of rubber origin. The board 2 may have a thickness of 1–2 millimeters while the electrodes may have a thickness of several hundreds angstroms.

Numeral 8 represents a filter having a thickness of 0.3 millimeter as an example, fixedly attached to the upper surface of base board 2 and adapted for interrupting incoming detrimental outside light beams such as ultraviolet and infrared beams to the elastomer from invading into the interior of the structure 1.

The working mode of the elastomer display structure 1 so far shown and described will be set forth in addition to the description of remaining several constituent parts.

For easiness of understanding, it is now assumed that upper and lower electrodes 3b and 5 are only electrostatically energized from a battery 9 of 60 volts, while the remaining upper electrode 3a is unenergized. It is further assumed that there is an incoming light beam A passing through the latter electrode 3a and the display element 4 and being reflected by the layer 6, thereby the element 4 as well as other plain part of lower surface of the transparent board 2 being in non-displaying state.

On the other hand, voltage is being applied between upper and lower electrodes 3b and 5 from the battery 9 and a part 4a of the lower surface of elastomeric display element 4 confronting the layer 6 and being in opposition to electrode 3b is electrostatically distorted to represent a diffused reflection surface, being called "frosted area" by those skilled in the art. Thus, light rays shown at B, incoming from upper and passing through the upper electrode 3b are reflected by the frosted zone 4a, thereby performing a corresponding optical display job as a result of thereby induced electrical field effect. Upon release of the impressed voltage, the frosted area 4a and the corresponding optical or illuminating display will disappear.

As may well be acknowledged from the foregoing disclosure, the elastomeric display unit 1 performs its display job in a kind of the solid state way by the field effect, inviting no current flow. The working or impressed voltage depends upon the thickness dimension of elastomeric display element 4. As an example, when the element 4 has a thickness of 6 microns, about 60 volts will suffice for the necessary voltage impression for display at a responding speed less than 1 millisecond.

Since the unit 1 operates with the elastomeric display element 4 which is a kind of solid display element representing a better and easier machinability, the use of a high grade seal-in frame or the like means as frequently and necessarily employed in the filling-up and seal-in job of a fluidous liquid crystal, may be completely dispensed with. Further, since the display element does not operate upon the polarizing principle, conventionally used polarizer plate may be definitely dispensed with, thereby the whole structure of the display unit being substantially simplified.

Figure 2:
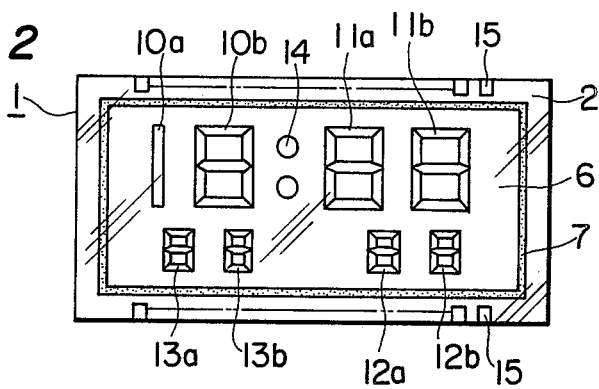
FIG. 2 is a plan view of a digital time display unit of an electronic watch embodying the structural principles of the elastomeric display structure shown in FIG. 1.

In FIG. 2 which is a schematic representation of a digital display unit of an electronic watch, being constructed according to the principles of the invention set forth hereinbefore in connection with FIG. 1 and having a rectangular shape as shown, numeral 6 represents a reflecting a layer as before which is visible through transparent base board 2 and elastomeric display elements not shown. Below the reflecting layer 6, there is a lower electrode 5 of same structure as before and covering substantially whole area of the display unit shown, although not shown.

10a, 10b–13a, 13b and 14 representative groups of display segments, each of these segments comprising a pair of correspondingly shaped and mutually opposed upper electrode and a broad and common lower electrodes as at 3b and 5 shown in FIG. 1. More specifically, numeral 10a denotes a segment group for tens hour digit, practically, however, shaped into a single line adapted for on-off demonstration of numeral 1. Numeral 10b represents a segment group for unit hour digits 0, 1 . . . 9, and comprising seven segments as commonly known. Numeral 11a represents a segment group for tens minute display having the similar structure as that shown at 10b hereinabove. However, the numerical displays are limited 0, 1 . . . 5. Numeral 11b represents a segment group for unit minute display having the similar structure as that shown at 10b, adapted for selective display of 0, 1 . . . or 9. Numeral 12a represents a segment group for tens seconds display and having similar structure adapted for showing selective display of 0, 1 . . . 5. Numeral 12b represents a segment group of similar structure for unit seconds display and adapted for selective demonstration of digits 0, 1 . . . 9.

In the similar way, numerals 13a and 13b represent respective segment groups for tens and unit day displays.

Numeral 14 represents a color display for on-off demostration of each second, or every fifth second.

There are provided two series of lead terminals along the upper and lower edges of the display unit having the shown display segments pattern for electrical connection of the contained segment electrodes in the pattern to an outside drive circuit, not shown.

These lead terminals are formed on the lower surface of the transparent base board 2 simultaneously with the evaporative deposition of upper electrodes as at 3a, 3b and etc., although not shown in FIG. 1. Numeral 7 represents a mass of adhesive material for proper positioning and sealing off the periphery of the display pattern.

The digital display unit 1 shown in FIG. 2 can be operated as in the known way with the comparative conventional liquid crystal type one. But, in this case, no fear is substantially necessary of the electrolylic deterioration of display segments caused by repeated application of d.c. voltages. Therefore, when necessary, the a.c. drive system can be dispensed with and thus, the whole structure including the drive circuit can be substantially simplified.

Figure 3:
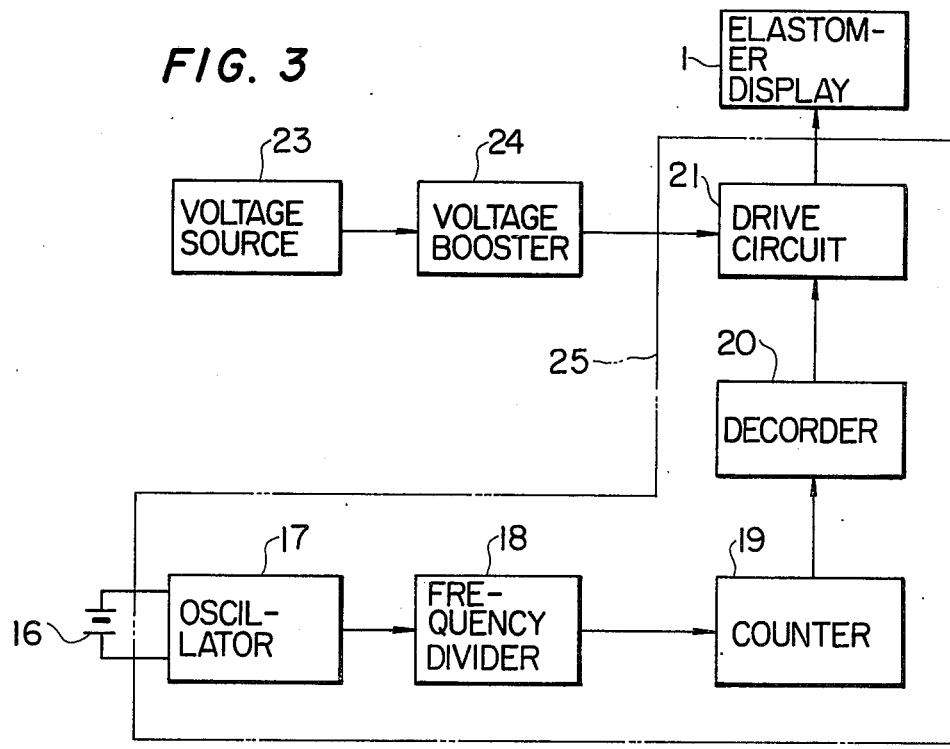
FIG. 3 is a circuit block representation of an electronic digital time display watch adapted for driving the display unit shown in FIG. 2.

Next, referring to FIG. 3, a circuit arrangement of an electronic digital display timepiece fitted with the aforementioned display structure will be set forth only briefly.

In FIG. 3, numeral 16 represents a quartz oscillator used as a time base. Numeral 17 is an electronic oscillator adapted for bringing the quartz 16 into a periodic vibration as known per se, the electrical output frequency therefrom being 1–8 MHz in no limiting sense.

Numeral 18 represents an electronic frequency divider circuit which reduces its input frequency from the foregoing circuit 17 to 1 Hz-signals as its output.

Numeral 19 represents a counter circuit comprising a plurality of electronic counters, although not shown, correspondingly to said display segments for receiving said 1 Hz-signals and for driving these segments to show properly selected time displays in effect.

Numeral 20 represents an electronic decoder circuit for receiving binary signal output from the foregoing counter circuit 19 for the execution of a proper code conversion job.

Numeral 21 represents a drive circuit for driving the elementary elastomeric structures contained in the display unit 1 shown in FIG. 2 in accordance with the output signal from the decoder circuit 20.

Numeral 24 represents a booster circuit for boosting the battery voltage, say 1.5 volts, up to a working one, say 60 volts, adapted for drive of elastomeric display segments. Thus, the battery nomination at 9 in FIG. 1 may correspond to the output from the booster 24.

In FIG. 3, the several foregoing circuits 17–21 are encircled by a dotted line block 25 to schematically demonstrate that these are united into a one clip integrated C-MOS circuit block.

The several circuits shown in FIG. 3 are electrically connected one after another as shown therein and the overall operation could be easily understood from the foregoing description in consultation of prior art knowledge of the comparative liquid crystal digital display timepiece.

Briefly, the time base signal delivered by the cooperation of quart oscillator 16 and oscillator circuit 17 is modified by the frequency divider 18 to 1 Hz-signal for driving the counter 19. Respective time signals produced by the counters contained in the circuit 19 are decoded at 20 and fed through the driver 21 to selected display segments of display unit 1 shown in FIG. 2 for properly displaying occasional time point.

Figure 4:
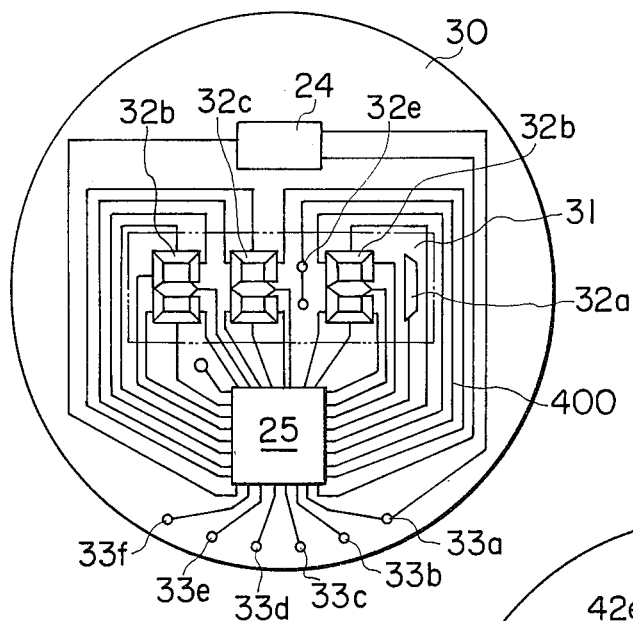
FIG. 4 is a top plan view of a circular type digital time display unit as a modification of the rectangular style display unit shown in FIG. 2.

In FIG. 4, a second embodiment of an electronic digital display timepiece as a modification shown in FIG. 2.

In FIG. 2, numeral 30 represents a transparent base board shaped into a round disc. Numeral 31 represents a rectangular block shown in chain-dotted line for showing a digital display unit corresponding to that denoted 1 in FIG. 2. A display pattern comprising segments groups 32a–32e arranged substantially in the similar manner as those at 10a; 10b; 11a; 11b and 14, yet shown substantially in inverted arrangement. These include naturally transparent electrodes. 24 denotes a booster and 25 an integrated circuit, as before.

Numeral 33a–33f are a group of connection terminals to outside circuits evaporatively formed in the similar way with those shown at 15 in FIG. 2, the arrangement being, however, somewhat different from the foregoing.

The booster 24, IC-block 25 and display unit 31 are electrically connected with each other as shown by means of leads 400 arranged and formed again evaporatively in a pattern 4, so as to represent a lead-electrode pattern. Practically the blocks 24 and 25 are electrically connected with the pattern 400 upon applying a conductive adhesive or a fused solder. Although not shown, the structure shown in FIG. 4 comprises naturally an elastomeric display element.

Figure 5:
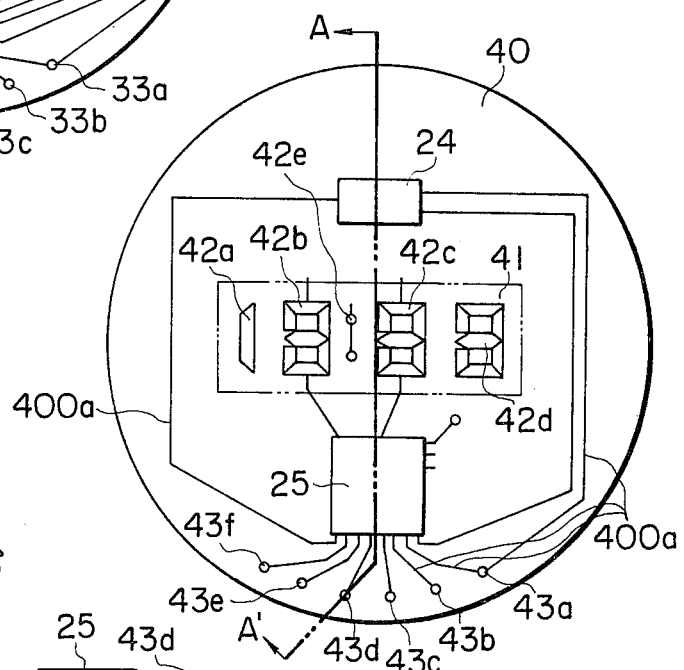
FIG. 5 is a top plan view of a display unit as a further modification of the unit shown in FIG. 4.
Figure 6:
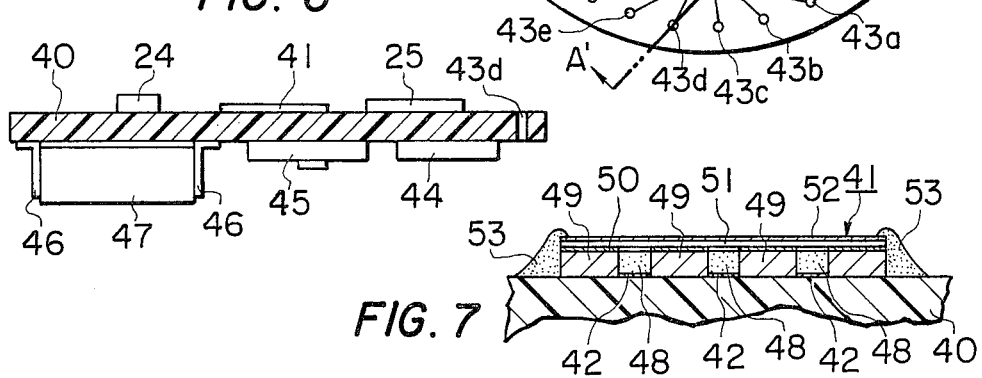
FIG. 6 is a sectional view taken along a section line A-A' in FIG. 5.
Figure 7:
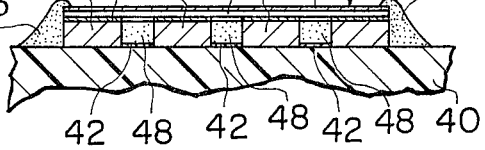
FIG. 7 is a substantially enlarged view of a part of FIG. 6.

In FIGS. 5–7, a third embodiment of the improved electronic timepiece, as a further modification from the first embodiment shown in FIGS. 2–3, is shown. In FIG. 5, a timepiece base board is shown which is formed with an elastomeric display unit.

In these Figures, numeral 40 represents a circular base board made of a ceramic material which fact is also applicable to the foregoing board 30 shown in FIG. 4. A chain-dotted line rectangular block 41 represents a display unit which is similar to that shown at 31 in FIG. 4. Numeral 42a–42c show respective display segments groups corresponding to those denoted 32a–32e in the foregoing; and arranged to show a display pattern as before.

Numerals 24 and 25 demonstrate those blocks as denoted before.

Numerals 43a–43f are through-hole electrodes which are positioned correspondingly to those shown at 33a–33f in the foregoing.

Blocks 24 and 25 and the display pattern 41 are electrically connected with several through-hole electrodes 43a–43f by means of a rather simpler connection lead pattern 400a which has been formed evaporatively or by the circuit-printing technique. This latter mode of technique can also be applied to the second embodiment.

In practice, after the formation of the elastomeric display unit at the position of the display 41, as will be later described in more detail at 41' shown in FIG. 7, the counter IC-block 25 and voltage booster 24 are mounted on the connection leads pattern 400a after supplied with conductive adhesive material or fused solder for fixation thereof.

Then, at the back surface of ceramic base plate 40, quartz oscillator 44, trimmer condenser 45 and battery 47 with its holder 46 are mounted in position.

The electrical connection of IC-block 25 and other related parts mounted on the upper surface of base plate 40, on the one hand, and the several parts 44, 45 and 47 mounted on the lower surface of the base plate is realized through said through-hole electrodes 43a–43f.

Next, referring to FIG. 7, the preparation and positioning of the elastomeric display 41' will be described in detail.

At the position of display pattern segments, conductive rubber material 48 is applied on the upper surface of the base board 40 in the form of a thin layer as by the screen printing technique or the like procedure, while the remaining ineffective zones are applied in the similar way with insulating rubber layer 49. Then, a reflecting layer 50 is applied on the composite rubber layer by the evaporative deposition of indium oxide or the like material and further with an elastomer layer 51 by the spinner, ion-plating method or the like conventional thin layer depositing technique. Finally, a common electrode layer 52 is similarly applied by the evaporative thin layer forming process. Then, the periphery of the thus formed assembly unit is fixedly positioned and roughly sealed off by the application of a rubber base adhesive 53 on the base board of the watch, preferably the lower plate thereof.

In the present embodiment, the IC-block and the display unit are mounted in position at the upper surface of the watch base plate and they can be electrically connected by the leads-electrodes pattern formed on the same surface of the plate. Conventionally used interconnector means for connection of these two blocks may, therefore, be dispensed with, thus the assembly procedure being highly simplified and eased.

In the present third embodiment, when adopted in place of the first embodiment, the use of specifically and separately prepared transparent base board can be dispensed with and the display unit can be directly formed on the watch base plate per se, thereby the difficulty in the realization of the desirous thin thickness type watch being solved out substantially.

Figure 8:
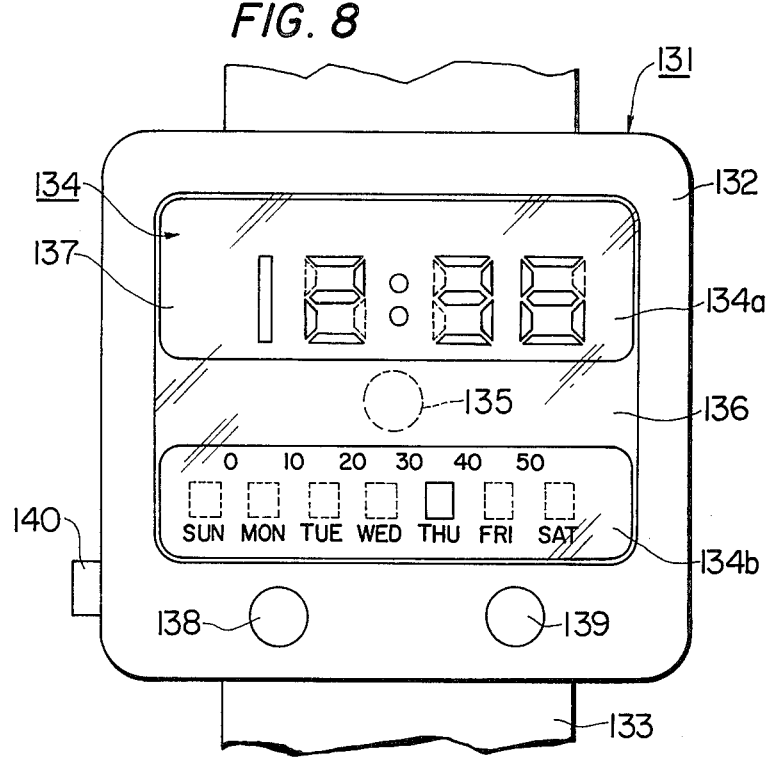
FIG. 8 is a plan view of a watch having a digital display unit as a further modification of the unit shown in FIG. 2.

In a watch 131 shown in FIG. 8, numeral 132 represents a watch case while 133 shows a watch band attached thereto. Numeral 134 represents elastomeric display unit which comprises a digital time display section 134a which is a slight modification from the corresponding part shown in FIG. 2 comprising segments groups of a tens hour display, a unit hour display, a colon, a tens minute display and a unit minute display, as was already described, and a digital seconds and week display section 134b in which seconds sunday and week days are selectively displayed.

At the center of the watch and between these both display sections, there is provided a illuminatable lamp 135 shown by a small dotted circle.

Numeral 136 represents a reflecting layer made of a thin metal film evaporatively deposited on the lower surface of the protecting glass or crystal acting as a transparent top glass or plastic base plate of the nature which has been already described hereinbefore.

The light coming from the lamp 135 will be reflected from the reflecting layer 136 so as to illuminate all the display elements of the both display sections 134a and 134b. The latter section 134b is constructed in the similar manner basically as the former section, although its pattern is different from the foregoing one.

In order to avoid direct and puzzling observation of the lamp 135 by the viewer for a long time, proper on-off control means are provided.

Numeral 138 represents a conventional correction figure selection switch of the push button type and numeral 139 represents a conventional display correction push button which is brought into operation after the former switch has been actuated, as known per se. Numeral 140 represents a further push button by which the lamp 135 is on-off controlled.

Figure 9:
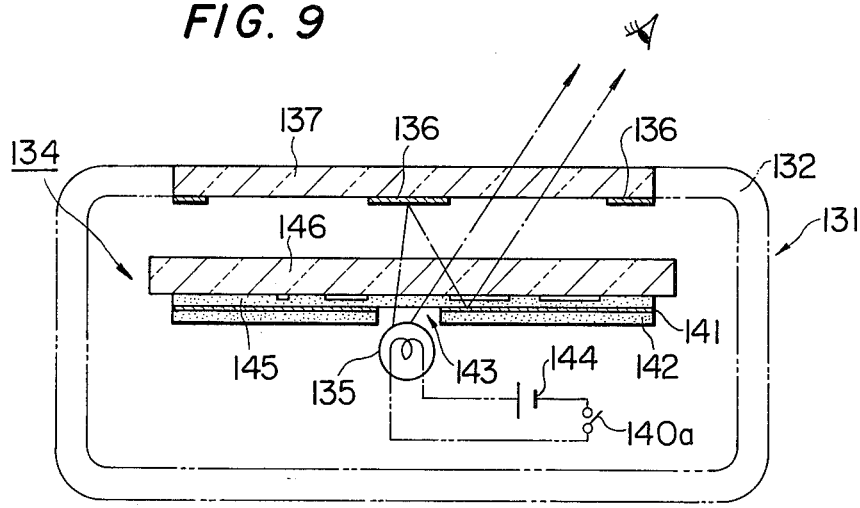
FIG. 9 is a highly simplified schematic vertical section of the watch shown in FIG. 8 and along the axial line of the display unit thereof.

Next, turning to FIG. 9, the reflecting layer is shown specifically at 141. Numeral 142 represents a conductive elastomeric layer of the kind referred to hereinbefore. At a part of these two layers 141 and 142 substantially covering the lamp 135 and provided substantially at the center of the watch when seen on the plain view of the overall display unit, a cleared away- and light-passing window 143 is formed as seen. A switch 140a which is related with the said push button 140 is inserted in the lamp circuit including a small battery 144, although the cooperatingly working mechanism for these switches 140 and 140a has been omitted from being illustrated only for simplicity.

Light rays emanating from the lamp 135 will advance through the window 143, elastomeric layer 145 and glass plate 146 and impinge upon the reflecting layer 136 deposited on the lower surface of the protecting glass 137 as referred to hereinbefore, and reflect therefrom so as to illuminate the display unit 134. If necessary, the protecting glass may have a convexedly curved section as usual.

In an alternative way, the reflecting layer may be provided on the upper surface of the glass plate 146.

Or still alternatively, a carrier plate, not shown, may be arranged between the both glass plates 136 and 137 and the reflecting layer may be deposited on the rear surface of the carrier plate.

In place of the reflecting layer of the above kind, it may be replaced by a specific on-off controllable reflecting "frostable" surface or layer may be provided.

Figure 10:
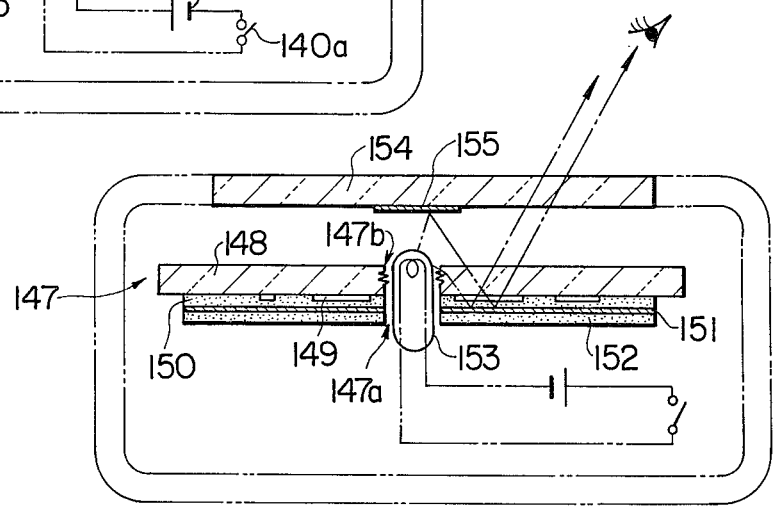
FIG. 10 is a similar view to FIG. 9, showing a slight modification thereof.

In a slightly modified arrangement shown in FIG. 10, a similar window 147a is formed through a glass plate 148, a transparent electrode 149, an elastomeric layer 150, a reflecting layer 151 and a conducting elastomeric layer 152 substantially at the center of the display unit 147, and a lamp 153 is provided in this window.

A roughed or serrated surface 147b is formed on the inside wall of a central bore 147, only correspondingly, however, to the thickness of glass plate 148, for irregularly reflect the light rays coming from the lamp 153 so as to illuminate laterally through the material of glass plate 148. A reflecting surface or layer 155 is provided on the rear surface of protecting glass 154 and substantially in registration to lamp 153 adapted for reflecting the light beams coming therefrom for illuminating the reflecting unit 147 additionally from upper.

Figure 11:
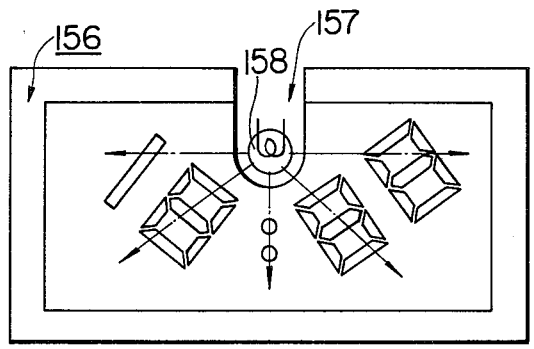
FIG. 11 is a highly schematic plan view of a still modified display unit.

In a still further modification shown in FIG. 11, numeral 156 represents a modified elastomeric display unit as a whole which represents an elongated recess 157 extending from one peripheral side towards the center of the display unit when seen in its plan view of FIG. 11, a lamp 158 being positioned substantially at the bottom of the said recess when seen in the same figure.

Figure 12:
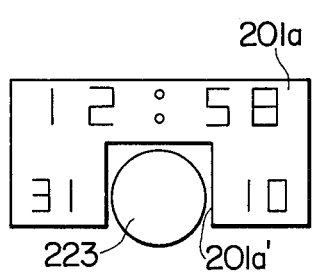
FIGS. 12–15 are several schematic plan views of elastomeric display units.

The display elements or segments groups are arranged along an imaginary curved line which a concave one relative to the lamp. Therefore, substantially even illumination of the display elements constituting the display pattern, by the lamp can be assured. Although not shown, a reflecting layer is provided on the rear surface of a protecting glass plate or a an intermediate carrier plate, as in the similar way already set forth hereinbefore in connection with FIG. 9 or 10, although not shown specifically only for simplicity of the disclosure. The recess 157 can be deemed as a kind of light-passing window. In FIG. 12, a modified display pattern 201a is shown. The display unit representing the pattern is formed with an inwardly extending recess 201a' for substantially housing a battery 223 for space-spare purpose. The composite structure of the display unit may be display unit may be same to any one of the foregoing elastomer-containing one, although not shown. The time display in this modification shows 12 hour 50 minutes while the seconds display represents 10 seconds. Data display represents 31st day.

Figure 13:
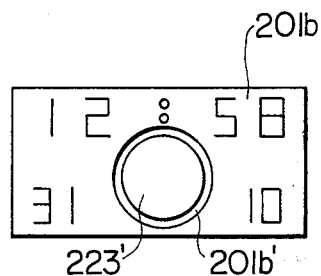

In FIG. 13, a still further modified display pattern 201b is shown. The display unit representing the pattern is formed with a slightly off-set circular cutout 201b' in the lateral direction, for housing concentrically a small in an optimal way. The time-, seconds and date displays are similar to those shown in FIG. 12. The constituents arrangement may be same as that which was set forth above.

Figure 14:
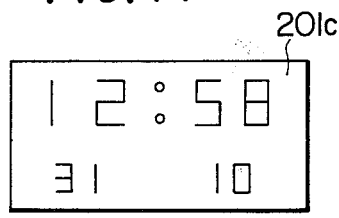
Figure 16:
FIGS. 16 and 17 are two elevational views of elastomeric display units.

In a further modified elastomer-containing display unit or briefly elastomeric display structure 201c shown in FIG. 14 has a rectangular plan configuration similar to that shown in FIG. 2. The elevational representation has, however, a convex curve as shown in FIG. 16. The exemplarly shown pattern is same as before.

Figure 15:
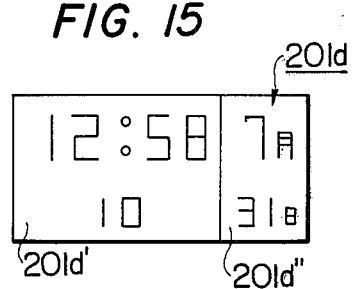
Figure 17:
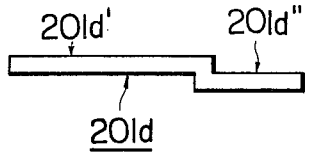

Another modification of the elastomeric display unit 201d is shown in FIG. 15. The elevation is of the stepped configuration as shown in FIG. 17. Time display represents 12 hours 50 minutes same as before. Seconds display represents 10 seconds. The overall time display section 201d' including colon display is shown at a higher level in FIG. 17, while the month-date display section 201d" represent now July 31 by way of example is positioned at a slightly lower level in FIG. 17.

Figure 18:
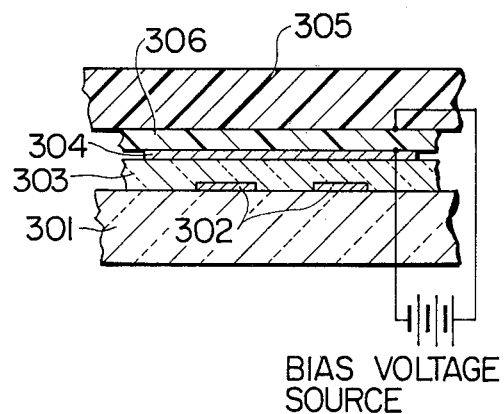
FIG. 18 is a schematic sectional model of an elastomeric display element according to this invention.

In connection with FIG. 18, a slightly modified elastomeric display structure will now be described.

In this figure, numeral 301 represents a glass plate or an elastic resin sheet acting as a transparent base plate on which a digital display pattern is provided, two representative segments being shown at 302 and made of a transparent electrode layer as before.

Numeral 303 represents a transparent elastomer thin layer of such nature that when subjected to electrical field effect, it produces "frosted" zone or zones in corresponding arrangement of charged electrode or electrodes, for diffusingly providing a visible contrast when receiving incoming light beams. Numeral 304 represents a light-reflecting thin metal layer applied onto the upper surface of the elastomer thin layer. 305 represents a conductive elastomeric layer acting as a common counter electrode, for facilitating the formation of the frosted zone by its own elastic deformation when subjected to an electrical field effect, as was set forth hereinbefore. In the present modified structure, an electrical plate 306 is sandwiched between the both layers 304 and 305 as shown. This electrical plate is being applied with a bias voltage slightly lower than the threshold voltage for generating the frosted zone, so as to polarize electrically at their both surfaces to opposite polarities.

When a display voltage is impressed to the structure as was referred to hereinbefore, the signal voltage is added to the polarizing bias voltage so that the application of a relatively lower signal voltage of only several volts as an example will suffice to induce the frost formation.

The electrical plate must not always consist of a homogenous material, and, if necessary, it may have the same configuration as the desired display pattern. Partial polarization of patterned area will also suffice for the desired purpose.

The material of the electrical plate may preferably be "Teflon", vinylidene fluoride or the like material and the thickness may amount to about 15–40 microns, most preferably in the order of 25 microns. When impressed with voltage, the electrical positive and negative charges are accumulated at the both surfaces of the plate material, thereby an electrical polarization taking place.

When the impressing polarizing voltage exceeds the threshold value for display, a permanent display can be brought about, thus providing a memory element capable of representing an occasionally selected display. This possibility can be realized with the present invention wherein the drive of the elastomeric display elements is performed in the purely electro-statically, thus no current being consumed therefor.

It is possible to provide a separate bias voltage source, in deed, in the form of a small capacity layer-built dry cell or the like.

Although the position for insertion of the electrical plate has been shown and described only in a specific way for the illustration purpose, the invention must not be limited only thereto.

The embodiments of the invention in which an exclusive property or privilege is claimed are as follows:

1. An electronic timepiece with digital display means, comprising a crystal quartz oscillator circuit, a frequency divider circuit receiving signal output therefrom for dividing frequency of said signal into a lower frequency one, a counter circuit for converting the lower frequency signal into time display signal for driving said digital display means through a driver circuit, said display means comprises an elastomeric display structure comprised of a laminated structure, a part of the latter is cut away to form a light-passing window, and an illuminating light source is arranged in close proximity to said window.

2. Electronic timepiece with digital display means of claim 1 wherein said elastomer display structure comprises a reflecting layer having a cut-away portion for providing said window.

3. Electronic timepiece with digital display means of claim 1 wherein said cut-out portion is a perforation.

4. Electronic timepiece with digital display means of claim 1, further comprising a glass plate or a carrier plate covering time display surface of said structure and comprising further reflecting means for reflecting light beams coming from said light source towards said display surface.

5. Electronic timepiece with digital display means, comprising a crystal quartz oscillator circuit, a frequency divider circuit receiving a signal output therefrom for dividing frequency of said signal into a lower frequency one, a counter circuit for converting the lower frequency signal into time display signal for driving said digital display means through a driver circuit, said display means comprises an elastomeric display structure wherein electronic (elastomer) elastomeric display elements of said structure is preparatorily impressed a d.c. bias voltage for later overlapping with display signals.

6. Electronic timepiece with display means of claim 5 wherein said structure comprises an electrical layer, said d.c. bias voltage being impressed thereto in such way that "frosted" surface does not appear.

7. In an elastomeric display for an electronic timepiece, said timepiece comprising an oscillator circuit, a frequency divider circuit adapted for dividing the frequency of said oscillator circuit, a counter circuit, a driver circuit, and display means designed and arranged for displaying the output from said frequency divider circuit, and a voltage circuit for operating the display circuit, an improvement in said display means comprising;
   a transparent baseboard;
   a plurality of transparent display electrodes adapted for displaying display patterns located on one side of said transparent baseboard;
   a thin film layer of high molecular elastomer adapted for fine reflecting frost when subjected to an electrical charge located on said transparent display electrodes away from said transparent baseboard;
   a light-reflecting layer covering said thin film layer away from said transparent display electrodes; and
   an electrode layer made of conductive high polymeric and elastomeric material located on said light-reflecting layer away from said thin film layer.

8. The electronic timepiece of claim 7 wherein said thin film layer, said light-reflecting layer, and said electrode layer are laminated on said transparent baseboard by said transparent display electrodes.

9. The electronic timepiece of claim 7 wherein said display means further includes means for sealing said display means against external humidity said means comprising an organic substance.

10. One electronic timepiece of claim 7 wherein said display means further includes means for protecting said thin film layer and said electrode layer from adverse radiation said means comprising an optical filter.

11. The electronic timepiece of claim 7 wherein said display means further include a surface formed with recesses suitable for mounting other components therein.

12. The electronic timepiece of claim 7 wherein said transparent baseboard includes a curved surface.

* * * * *